United States Patent
Oh et al.

(10) Patent No.: US 10,313,762 B2
(45) Date of Patent: Jun. 4, 2019

(54) METHOD AND SYSTEM FOR MANAGING TIME MACHINE FUNCTION OF VIDEO CONTENT

(71) Applicant: NAVER Corporation, Seongnam-si (KR)

(72) Inventors: Jaewon Oh, Seongnam-si (KR); SeungKwan Yang, Seongnam-si (KR); ByungJo Yoon, Seongnam-si (KR); Kiyoung Park, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 276 days.

(21) Appl. No.: 15/341,510

(22) Filed: Nov. 2, 2016

(65) Prior Publication Data

US 2017/0164069 A1 Jun. 8, 2017

(30) Foreign Application Priority Data

Dec. 8, 2015 (KR) ......................... 10-2015-0174139

(51) Int. Cl.
*H04N 21/6587* (2011.01)
*H04N 21/2187* (2011.01)
(Continued)

(52) U.S. Cl.
CPC ..... *H04N 21/6587* (2013.01); *H04L 65/4069* (2013.01); *H04L 65/4092* (2013.01);
(Continued)

(58) Field of Classification Search
CPC ........... H04N 21/6587; H04N 21/2187; H04N 21/23106; H04N 21/2387; H04N 21/632; H04L 65/4069; H04L 65/4092
See application file for complete search history.

(56) References Cited

U.S. PATENT DOCUMENTS

| 9,813,752 B2* | 11/2017 | Hjelmstedt | H04N 5/445 |
| 2012/0265853 A1* | 10/2012 | Knox | H04N 21/2187 |
| | | | 709/218 |

(Continued)

FOREIGN PATENT DOCUMENTS

| JP | 2006-511158 A | 3/2006 |
| JP | 2013-176025 A | 9/2013 |

(Continued)

OTHER PUBLICATIONS

Korean Office Action dated Dec. 6, 2018 by the Korean Patent Office corresponding to Korean patent application No. 10-2015-0174139.

(Continued)

*Primary Examiner* — Brian J. Gillis
*Assistant Examiner* — Chhian (Amy) Ling
(74) *Attorney, Agent, or Firm* — Greer, Burns & Crain, Ltd.

(57) ABSTRACT

Provided is a method and system for managing a sliding window for a time machine function, the method including creating a virtual sliding piece array that includes information for specifying pieces from the latest point in time of live stream data to a previous point in time of a time machine available time preset to provide the time machine function; creating a streaming sliding window for specifying a preset number of continuous pieces among pieces specified in the virtual sliding piece array; shifting the streaming sliding window to a piece index of a play location requested for the live stream data, and downloading the pieces specified in the virtual sliding piece array through the streaming sliding window; and streaming stream data from a streaming client installed on an electronic device to a player installed on the electronic device using the downloaded pieces in order to provide a live streaming service.

11 Claims, 9 Drawing Sheets

(51) Int. Cl.
*H04L 29/06* (2006.01)
*H04N 21/231* (2011.01)
*H04N 21/2387* (2011.01)

(52) U.S. Cl.
CPC ..... *H04N 21/2187* (2013.01); *H04N 21/2387* (2013.01); *H04N 21/23106* (2013.01)

(56) References Cited

U.S. PATENT DOCUMENTS

| | | | |
|---|---|---|---|
| 2013/0260893 A1 | 10/2013 | Shin et al. | |
| 2013/0332543 A1 | 12/2013 | Shin et al. | |
| 2014/0019540 A1 | 1/2014 | Shin et al. | |
| 2014/0137162 A1* | 5/2014 | McNamee | H04N 21/2187 |
| | | | 725/63 |

FOREIGN PATENT DOCUMENTS

| | | | |
|---|---|---|---|
| KR | 10-2003-0022830 A | 3/2003 | |
| KR | 20030022830 A | 3/2003 | |
| KR | 10-2005-0085451 A | 8/2005 | |
| KR | 2008-0037770 A | 5/2008 | |
| KR | 20110116204 A | 10/2011 | |
| WO | WO2012114107 A2 * | 8/2012 | ........... H04N 21/845 |
| WO | WO 2015/065001 A2 | 5/2015 | |

OTHER PUBLICATIONS

Japanese Office Action dated Dec. 19, 2017 by the Japanese Patent Office corresponding to Japanese patent application No. 2016-208518.

Hei et al.; "A Measurement Study of a Large-Scale P2P IPTV System"; IEEE Trans. on Multimedia, vol. 9, No. 8; Dec. 2007; pp. 2-17/E.

Hei et al.; "Inferring Network-Wide Quality in P2P Live Streaming Systems"; IEEE Journal on Selected Areas in Communications, vol. 25, No. 9; Dec. 2007; pp. 2-16/E.

Peltotalo et al.; "Peer-to-Peer Streaming Technology Survey"; IEEE Computer Society; Seventh Int'l. Conf. on Networking; 2008; pp. 2-10/E.

Pianese et al.; "Pulse, a Flexible P2P Live Streaming System"; pp. 2-7/E.

* cited by examiner

METHOD AND SYSTEM FOR MANAGING TIME MACHINE FUNCTION OF VIDEO CONTENT

CROSS-REFERENCE TO RELATED APPLICATION(S)

This application claims priority under 35 U.S.C. § 119 to Korean Patent Application No. 10-2015-0174139 filed on Dec. 8, 2015, in the Korean Intellectual Property Office (KIPO), the entire contents of which are incorporated herein by reference.

BACKGROUND

Field

One or more example embodiments of the present invention relate to a method and system for managing a sliding window for a time machine function.

Description of Related Art

A time machine function of video content, for example, a broadcast program, which is provided live, refers to a function that enables a user to arbitrarily view at least a portion of a live video after a preset period of time is elapsed. The time machine function may be provided using a method of storing a live video and replaying the stored live video. For example, Korean Patent Registration No. 10-1300882 discloses an image display device having a time machine function and a control method thereof.

Reference materials may include PCT/KR/2014/010167, US20140019540A1, US20130332543A1, and US20130260893.

SUMMARY

One or more example embodiments provide a method and system that may download pieces of a play location specified through a time machine function using a streaming sliding window.

One or more example embodiments also provide a method and system that may further efficiently manage a live sliding window on which pieces for the latest live video are downloaded, separate from a streaming sliding window.

According to an aspect of at least one example embodiment, there is provided a method of managing a sliding window, the method including creating a virtual sliding piece array that includes information for specifying pieces from the latest point in time of live stream data to a previous point in time of a time machine available time preset to provide the time machine function; creating a streaming sliding window for specifying a preset number of continuous pieces among pieces specified in the virtual sliding piece array; shifting the streaming sliding window to a piece index of a play location requested for the live stream data, and downloading the pieces specified in the virtual sliding piece array through the streaming sliding window; and streaming stream data from a streaming client installed on an electronic device to a player installed on the electronic device using the downloaded pieces in order to provide a live streaming service.

The sliding window managing method may further include creating a live sliding window for specifying a preset number of most up-to-date continuous pieces among the pieces specified in the virtual sliding piece array; and downloading the pieces specified in the virtual sliding piece array through the live sliding window.

The pieces specified and downloaded through the live sliding window may be stored in a cache storage included in the electronic device or transmitted to another electronic device over a network in order to share latest data of the live stream data, regardless of the pieces specified and downloaded through the live sliding window being used for streaming the stream data to the player.

The downloading of the pieces specified in the virtual sliding piece array through the streaming sliding window may include reusing the pieces specified through the live sliding window and stored in the cache storage of the electronic device in response to overlapping between the streaming sliding window and the live sliding window.

The downloading of the pieces specified in the virtual sliding piece array through the streaming sliding window may include downloading the specified pieces from at least one of a cache storage included in the electronic device, another electronic device connected using a peer-to-peer (P2P) scheme, and a delivery server that provides pieces of the live stream data; and attempting to download the pieces based on priority order among the cache storage, the other electronic device, and the delivery server.

The play location requested for the live stream data may be transmitted from the player to the streaming client through a time machine control session set between the streaming client and the player, and the stream data being streaming may be transmitted from the streaming client to the player through a streaming session set between the streaming client and the player.

A data transmission between the streaming client and the player through the streaming session and a data transmission between the streaming client and the player through the time machine control session may proceed based on different separate protocols, respectively.

According to an aspect of at least one example embodiment, there is provided a non-transitory computer-readable recording medium storing a computer program to implement a sliding window managing method including creating a virtual sliding piece array that includes information for specifying pieces from the latest point in time of live stream data to a previous point in time of a time machine available time preset to provide the time machine function; creating a streaming sliding window for specifying a preset number of continuous pieces among pieces specified in the virtual sliding piece array; shifting the streaming sliding window to a piece index of a play location requested for the live stream data, and downloading the pieces specified in the virtual sliding piece array through the streaming sliding window; and streaming stream data from a streaming client installed on an electronic device to a player installed on the electronic device using the downloaded pieces in order to provide a live streaming service.

The sliding window managing method may further include creating a live sliding window for specifying a preset number of most up-to-date continuous pieces among the pieces specified in the virtual sliding piece array; and downloading the pieces specified in the virtual sliding piece array through the live sliding window.

The pieces specified and downloaded through the live sliding window may be stored in a cache storage included in the electronic device or transmitted to another electronic device over a network in order to share the latest data of the live stream data, regardless of the pieces specified and downloaded through the live sliding window being used for streaming the stream data to the player.

The downloading of the pieces specified in the virtual sliding piece array through the streaming sliding window may include reusing the pieces specified through the live sliding window and stored in the cache storage of the electronic device in response to overlapping between the streaming sliding window and the live sliding window.

The downloading of the pieces specified in the virtual sliding piece array through the streaming sliding window may include downloading the specified pieces from at least one of a cache storage included in the electronic device, another electronic device connected using a P2P scheme, and a delivery server that provides pieces of the live stream data; and attempting to download the pieces based on priority order among the cache storage, the other electronic device, and the delivery server.

According to an aspect of at least one example embodiment, there is provided a sliding window managing system of an electronic device configured as a computer, the system including one or more processors configured to execute non-transitory computer-readable instructions. The one or more processors include a virtual sliding piece array creator configured to create a virtual sliding piece array that includes information for specifying pieces from the latest point in time of live stream data to a previous point in time of a time machine available time preset to provide the time machine function; a streaming sliding window creator configured to create a streaming sliding window for specifying a preset number of continuous pieces among pieces specified in the virtual sliding piece array; a piece download controller configured to control the electronic device to shift the streaming sliding window to a piece index of a play location requested for the live stream data, and to download the pieces specified in the virtual sliding piece array through the streaming sliding window; and a streaming processor configured to stream stream data from a streaming client installed on an electronic device to a player installed on the electronic device using the downloaded pieces in order to provide a live streaming service.

The one or more processors may further include a live sliding window creator configured to create a live sliding window for specifying a preset number of most up-to-date continuous pieces among the pieces specified in the virtual sliding piece array, and the piece download controller may be further configured to download the pieces specified in the virtual sliding piece array through the live sliding window.

The pieces specified and downloaded through the live sliding window may be stored in a cache storage included in the electronic device or transmitted to another electronic device over a network in order to share the latest data of the live stream data, regardless of the pieces specified and downloaded through the live sliding window being used for streaming the stream data to the player.

The piece download controller is further configured to download the specified pieces from at least one of a cache storage included in the electronic device, another electronic device connected using a P2P scheme, and a delivery server that provides pieces of the live stream data, and to attempt to download the pieces based on priority order among the cache storage, the other electronic device, and the delivery server. According to some example embodiments, it is possible to download pieces of a play location specified through a time machine function using a streaming sliding window.

Also, according to some example embodiments, it is possible to further manage a live sliding window on which pieces for the latest live video are downloaded, separate from a streaming sliding window.

Also, according to some example embodiments, it is possible to minimize (or, alternatively, reduce) the use effect of a time machine function over a sharing rate of pieces for the latest live video by downloading pieces of a play location specified through the time machine function and downloading pieces for the latest data simultaneously using a dual sliding window that includes a live sliding window and a streaming sliding window.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
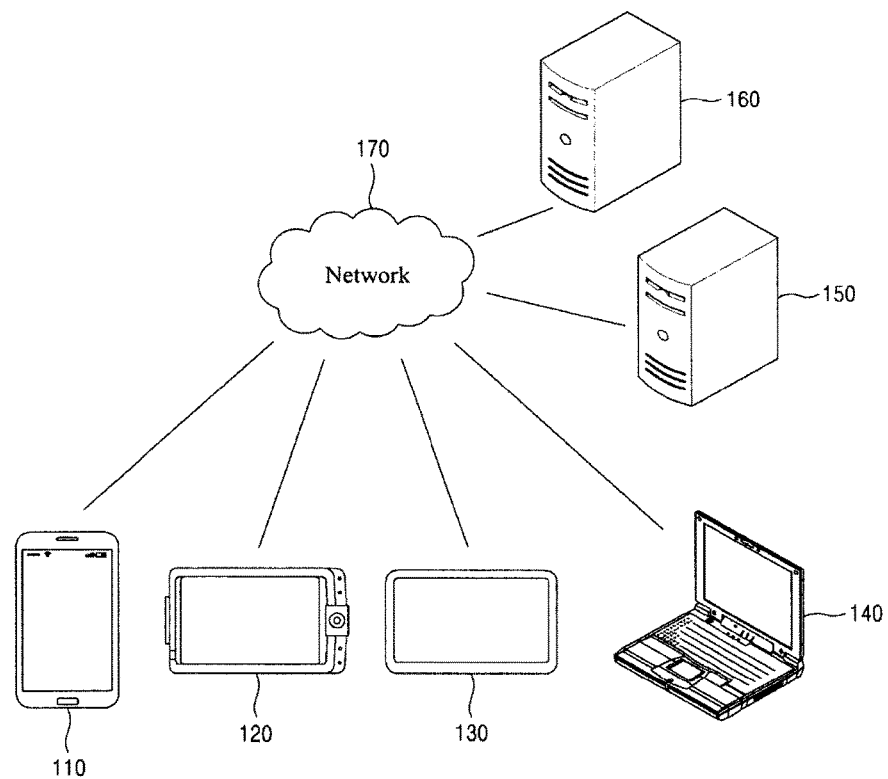
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, file, contents, services, and the like through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. Also, the server 160 may connect to the server 150 under control of at least one program, for example, a browser or the installed application, an operating system (OS) included in the electronic device 110, and may use a service or content provided from the server 150. For example, in response to a service request message transmitted from the electronic device 110 to the server 150 over the network 170 under control of the application, the server 150 may transmit a code corresponding to the service request message to the electronic device 110, and the electronic device 110 may provide content to the user by configuring and displaying a screen corresponding to the code under control of the application. As another example, the server 150 may set a communication session for a messaging service and may rout a message transmission and reception between the plurality of electronic devices 110, 120, 130, and/or 140 through the set communication session. As another example, the server 150 may provide a social network service to the electronic devices 110, 120, 130, and/or 140. Also, the servers 150 and/or 160 may provide a live streaming service to the plurality of electronic devices 110, 120, 130, and/or 140.

Figure 2:
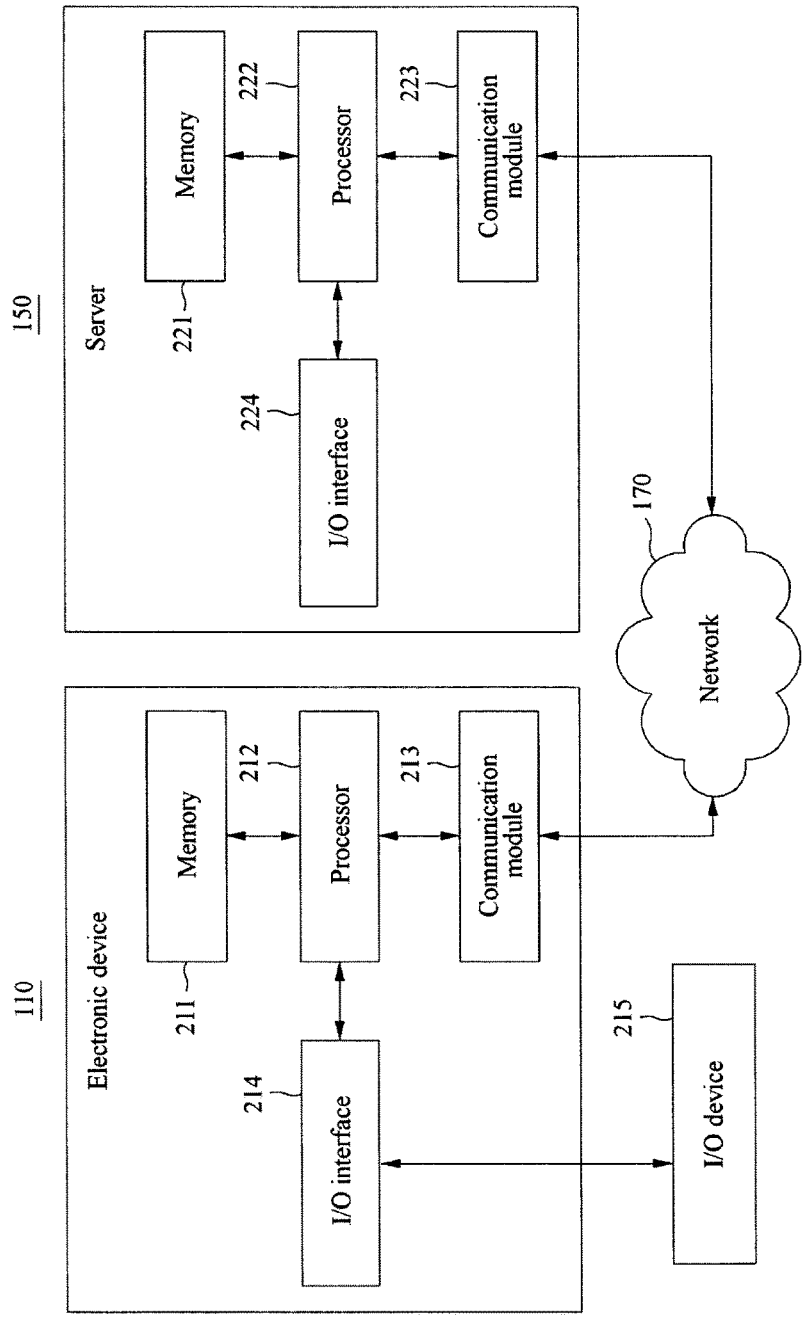
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar constituent elements may be applicable to other electronic devices 120, 130, and/or 140, or the server 160, and also to still other electronic devices or still other servers.

Referring to FIG. 2, the electronic device 110 includes a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Here, ROM and the permanent mass storage device may be included using a separate permanent storage device, separate from the memory 211, 221. Also, an OS and at least one program code, for example, the aforementioned code for browser or the application installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211, 221 through the communication modules 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processors 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication modules 213, 223 to the processors 212, 222. For example, the processors 212, 222 may be configured to execute received instructions in response to the program code stored in the storage device, such as the memory 211, 222.

The communication modules 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a streaming service request for content, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 may be a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214. Similarly, the I/O interface 224 may be a device used for interface with an I/O device (not shown) for the server 150.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O device 215, or may further include other constituent elements, for example, a transceiver, a global positioning system (GPS) module, a camera, a variety of sensors, a database, and the like.

Figure 3:
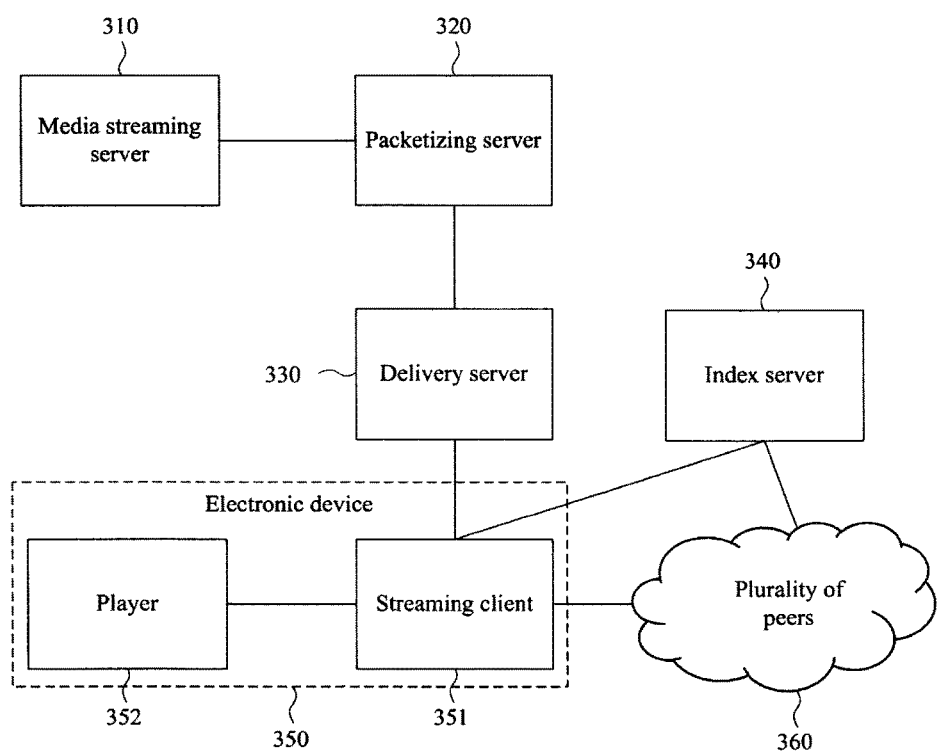
FIG. 3 is a diagram illustrating an example of an entire system environment for a live streaming service according to at least one example embodiment.

FIG. 3 is a diagram illustrating an example of an entire system environment for a live streaming service according to at least one example embodiment. FIG. 3 illustrates a media streaming server 310, a packetizing server 320, a delivery server 330, an index server 340, an electronic device 350, and a plurality of peers 360.

Each of the media streaming server 310, the packetizing server 320, the delivery server 330, and the index server 340 may be a device having the same or similar internal constituent elements to the server 150 described above with FIG. 1 and FIG. 2. Also, each of the plurality of peers 360 and the electronic device 350 may be a device having the same or similar internal constituent elements to the electronic device 110 described above with FIG. 1 and FIG. 2. Although FIG. 3 illustrates that each of the media streaming server 310, the packetizing server 320, the delivery server 330, and the index server 340 is provided as a single item, each server may be provided in a form of a group that includes a plurality of servers. For example, when professional baseball games are to be broadcasted live and in this instance, four games are in progress, a group of four media streaming servers for the respective four media sources may be present and a group of four packetizing servers for the respective four media sources may be present with respect to the four games. Likewise, each of the delivery server 330 and the index server 340 may be provided in a group that includes a plurality of servers depending on a necessity. For example, a required number of servers with respect to each of the delivery server 330 and the index server 340 may be determined based on a performance issue, such as a number of simultaneous connections.

The media streaming server 310 may be a media source device that includes an encoder (not shown) configured to provide live stream data. The packetizing server 320 receives the live stream data from the media streaming server 310, and packetizes or indexes the received live stream data to a piece in order to provide the received live stream data through a peer-to-peer (P2P) service. A method of packetizing or indexing stream data to a piece may use one of known various methods.

The delivery server 330 receives the packetized or indexed piece from the packetizing server 320, buffers the received piece, and transmits a piece about requested live stream data to a corresponding peer 360 in response to a request from the peer of the P2P service. Here, the peer 360 may indicate a client at a live streaming service using the P2P service, and may be configured as a single electronic device. The electronic device that configures the peer may include the electronic device 350 of FIG. 3, and may be a device having the same or similar internal constituent elements to the electronic device 110 described above with FIG. 1 and FIG. 2.

The index server 340 maintains a list of peers 360 and provides search results corresponding to a request from a peer.

An application, such as a streaming client 351, may be installed and executed on the electronic device 350 that configures the peer 360. Here, the electronic device 350 may receive a piece from the delivery server 330 or may receive a piece from other electronic devices that configure other peers, for example, the plurality of peers 360, under control of the executed streaming client 351.

Also, the streaming client 351 executed on the electronic device 350 may transmit live stream data to a player 352 that is another application installed and executed on the electronic device 350 through internal communication with the player 352 at the electronic device 350. Here, the live stream data provided from the streaming client 351 to the player 352 may be data that is combined based on pieces received from the delivery server 330 or at least a portion of the plurality of peers 360.

In this case, the player 352 may play the live stream data provided from the streaming client 351. In response thereto, the live stream data provided from the media streaming server 310 may be played at the electronic device 350 and may be provided to a user of the electronic device 350.

A streaming client, for example, the streaming client 351 of FIG. 3, which is installed and executed on an electronic device, for example, the electronic device 350 of FIG. 3, that configures a peer may provide a time machine function for live stream data to a user of the electronic device. As described above, in the related art, a control session for a time machine function is configured for each streaming protocol. According to example embodiments, a time machine control protocol may be in charge of only controlling a time machine function and a flash player of a streaming protocol, for example, a PC, between a streaming client and a player may be configured to use a real time messaging protocol (RTMP) as a streaming protocol, and a player of iOS or Android may be configured to use an HTTP live streaming (HLS) protocol and a streaming standard supported at the player as is as a streaming protocol. According to example embodiments, it is possible to control the time machine function using the same standard regardless of an OS or the player and to remove a dependence of the streaming client on the player. If the time machine control protocol is not supported at the player, a user may view only a live video using a streaming protocol used at an existing player using the player.

Figure 4:
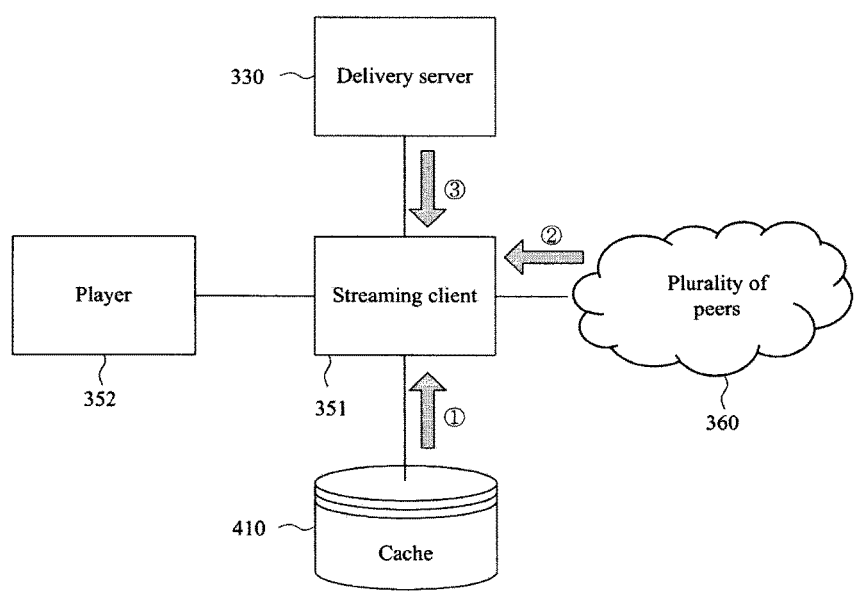
FIG. 4 is a diagram illustrating an example of a data request priority ranking for streaming according to at least one example embodiment.

FIG. 4 is a diagram illustrating an example of a data request priority ranking for streaming according to at least one example embodiment. FIG. 4 illustrates the delivery server 330, the streaming client 351, the player 352, and the plurality of peers 360. A peer 360 further includes a cache 410 further includable together with the streaming client 351 and the player 352.

Due to characteristics of a live broadcast, live stream data may be processed in such a manner that the streaming client 351 receives data provided from the plurality of peers 360 using a P2P scheme or data provided from the delivery server 330 and transfers the received data to the player 352 to be played at the player 352. There is no great need to store data. However, there is a need to play again previous data by providing a time machine function for a live broadcast. Thus, the streaming client 351 may control a peer 360 to store a preset (or, alternatively, desired) amount of previous data in a separate storage, such as the cache 410, in addition to a memory.

Accordingly, when providing the time machine function, the streaming client 351 may receive data for streaming from the storage such as the cache 410, for example, ① illustrated in FIG. 4. Data absent in the cache 410 may be provided from the plurality of peers 360 using the P2P scheme, for example, ② illustrated in FIG. 4. Data not provided from the plurality of peers 360 may be provided from the delivery server 330, for example, ③ illustrated in FIG. 4.

Figure 5:
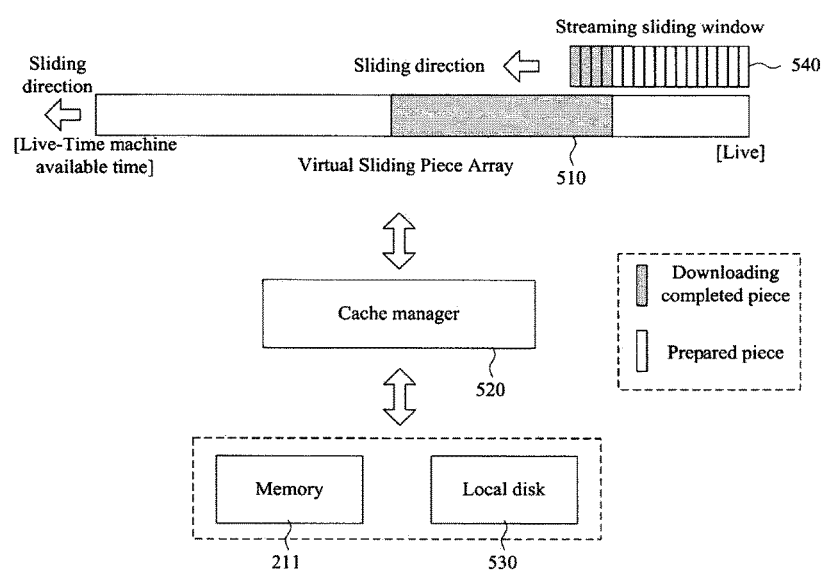
FIG. 5 illustrates an example of explaining a sliding window according to at least one example embodiment.

FIG. 5 illustrates an example of explaining a sliding window according to at least one example embodiment. Pieces of live stream data for providing a time machine function for the live stream data may be managed using a virtual sliding piece array 510 of FIG. 5. The virtual sliding piece array 510 does not indicate an array of actual pieces and may be data managed to specify a piece of a specific time in substantial temporal order. For example, the electronic device 350 may manage pieces received according to control of the streaming client 351, using the virtual sliding piece array 510 in temporal order. In detail, in the virtual sliding piece array 510, pieces present toward [Live] may be latest data and pieces present toward [Live-time machine available time] may be previous data. Here, the time machine available time is an index indicating how previous data can be played based on the most up-to-date data, for example, the most up-to-date piece, and may be indicated based on a unit of time such as millisecond (msec). If a time corresponding to [Live] is '0' and the time machine available time is 5 minutes (300,000 msec), [Live-time machine available time] may indicate that the user may rewind up to 5 minutes based on the latest data and view corresponding data.

Also, the streaming client 351 may include a cache manager 520, and may manage actual pieces stored in the memory 211 or a local disk 530 through the cache manager 520. For example, pieces stored in the memory 211 may be pieces received from the plurality of peers 360 or the delivery server 330, and pieces stored in the local disk 530 may be pieces corresponding to previous data of which streaming to the player 352 is completed for live streaming. That is, the streaming client 351 may stream a live broadcast video to the player 352 using the pieces stored in the memory 211 and may store used pieces in the local disk 530 to use a time machine function. In this case, the local disk 530 may correspond to the cache 410 of FIG. 4.

Here, a streaming sliding window 540 may be used to specify pieces to be transmitted to the player 352. For example, the streaming client 351 may download a plurality of pieces specified in the virtual sliding piece array 510 through the streaming sliding window 540, through the cache 410, the plurality of peers 360, or the delivery server 330, may transmit the downloaded pieces to the player 352, and may store the pieces in the cache 410. Here, the pieces may be transmitted to the player 352 using a streaming method according to a streaming protocol used between the streaming client 351 and the player 352.

Figure 6:
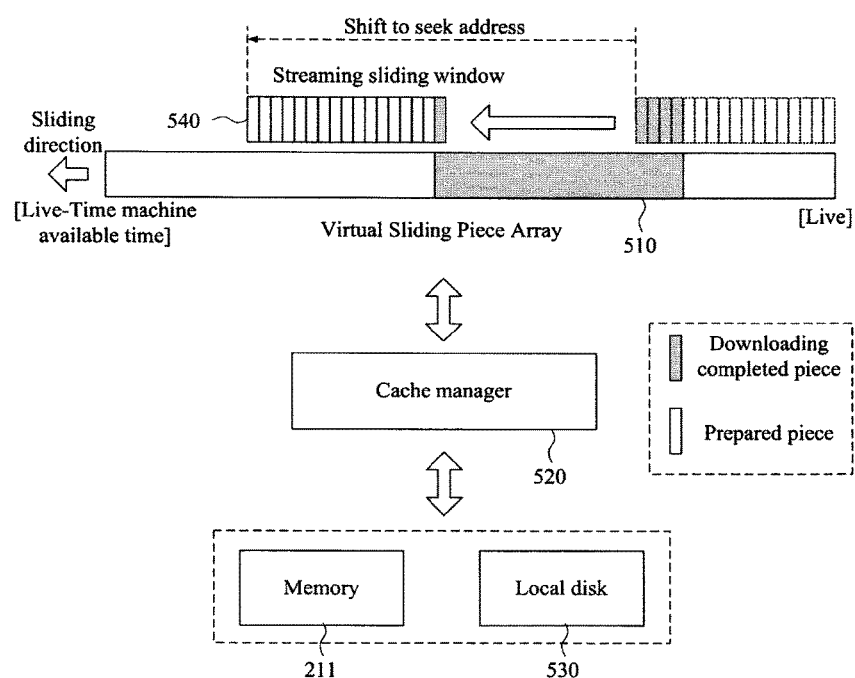
FIG. 6 illustrates an example of shifting a sliding window for seeking according to at least one example embodiment.

FIG. 6 illustrates an example of shifting a sliding window for seeking according to at least one example embodiment. FIG. 6 illustrates an example of shifting the streaming sliding window 540. For example, in response to a request from the player 352 for a time machine function, the streaming client 351 may transmit previous data to the player 352. Here, the player 352 may transmit a value to shift to the past (for example, a value of msec unit) to the streaming client 351 together with the request.

In an example in which the value transferred from the player 352 together with the request is 3 minutes (180,000 msec), the streaming client 351 may shift the streaming sliding window 540 from the currently specified location by 3 minutes, for example, to a location of the past corresponding to 3 minutes. FIG. 6 illustrates an example in which the streaming sliding window 540 is shifted to a seek address, for example, a seek offset. For example, the streaming client 351 may calculate a corresponding piece index using the requested 3 minutes (180,000 msec) and may shift the streaming sliding window 540 to a location corresponding to the calculated piece index.

Here, the streaming client 351 may specify pieces specified by the shifted streaming sliding window 540, in the virtual sliding piece array 510, and may download the specified pieces through the cache 410, the plurality of peers 360 or the delivery server 330, and may transmit the downloaded pieces to the player 352.

Figure 7:
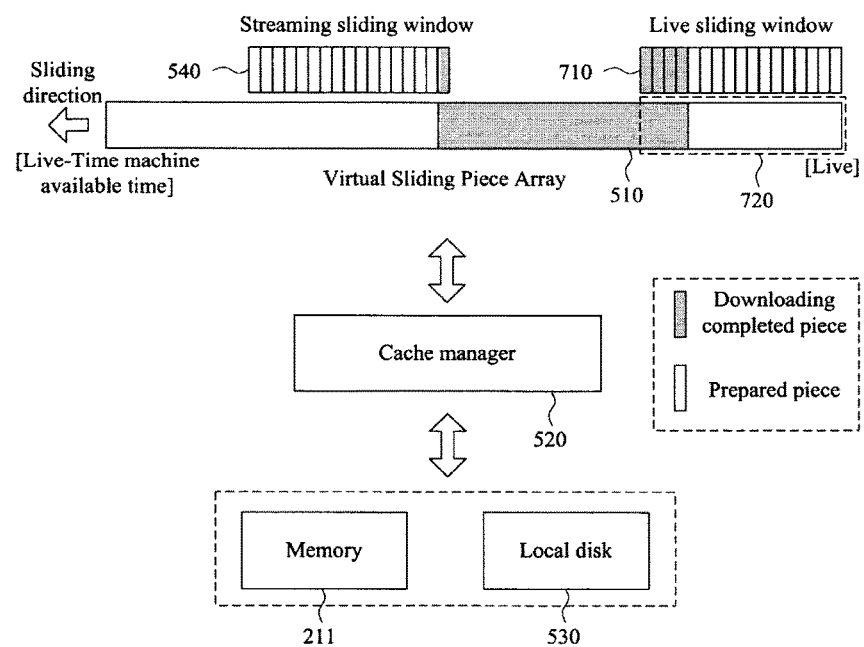
FIG. 7 illustrates an example of explaining a dual sliding window according to at least one example embodiment.

FIG. 7 illustrates an example of explaining a dual sliding window according to at least one example embodiment. FIG. 7 further illustrates a live sliding window 710 in addition to the streaming sliding window 540. The live sliding window 710 may be fixed at an area 720 for streaming the latest live video, and may be in charge of sharing downloading of a piece for a live video.

In a P2P service, a sharing rate of a corresponding piece may increase according to an increase in the number of peers 360 having the same piece. That the sharing rate increases indicates that a peer 360 not having the corresponding piece may easily acquire the piece from another peer in the P2P service. Accordingly, a number of peers having latest data may decrease according to an increase in the number of users using a time machine function. Thus, a sharing rate of pieces for a live video between the plurality of peers 360 may decrease.

According to an example embodiment, although users do not use a time machine function, the users may use the live sliding window 710 to minimize (or, alternatively, reduce) the use effect of the time machine function over the entire sharing rate. As described above, the live sliding window 710 may be fixed at the area 720 for streaming the latest live video and may be in charge of downloading and sharing a piece for a live video. The live sliding window 710 may operate only to share the latest data regardless of streaming data to the player 352. Here, pieces that are downloaded through the live sliding window 710 may be downloaded for sharing of the pieces, and may have no relation to streaming to the player 352. Thus, a need for aggressively downloading pieces is relatively low. Accordingly, the streaming client 351 may download pieces specified through the live sliding window 710 only from other peers, for example, the plurality of peers 360, and may store and share the downloaded pieces.

Also, when the user is to view the live video again while using the time machine function, the streaming sliding window is shifted toward the area 720 for streaming the live video. Here, since latest data is downloaded in advance using the live sliding window 710, the streaming client 351 may quickly provide pieces for the latest live video to the player 352.

Figure 8:
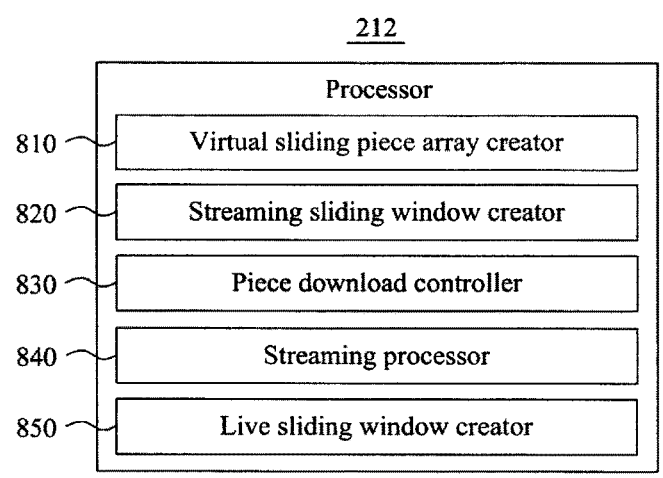
FIG. 8 is a block diagram illustrating an example of constituent elements includable in a processor of an electronic device according to at least one example embodiment.
Figure 9:
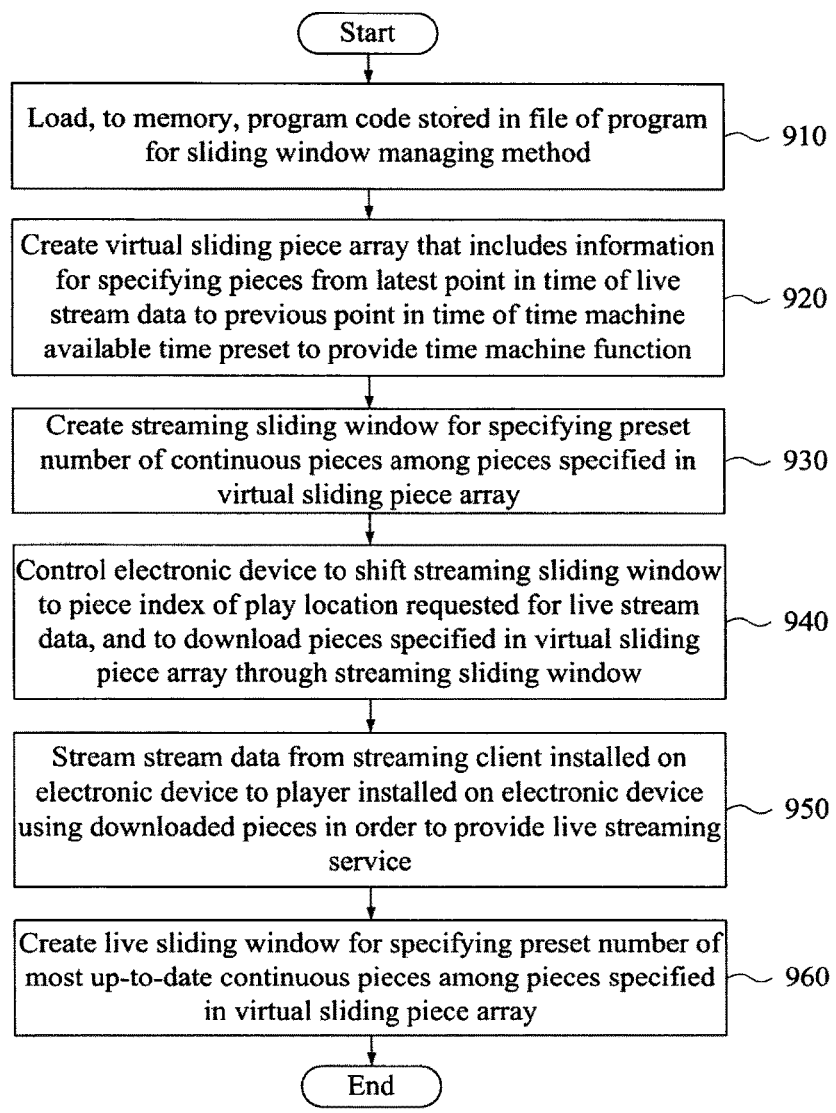
FIG. 9 is a flowchart illustrating an example of a time machine function providing method performed at an electronic device according to at least one example embodiment.

FIG. 8 is a block diagram illustrating an example of constituent elements or units includable in the processor 212 of the electronic device 110 according to at least one example embodiment, and FIG. 9 is a flowchart illustrating an example of a sliding window managing method performed at the electronic device 110 according to at least one example embodiment.

Referring to FIG. 8, the processor 212 of the electronic device 110 includes a virtual sliding piece array creator 810, a streaming sliding window creator 820, a piece download controller 830, a streaming processor 840, and a live sliding window creator 850. The processor 212 and constituent elements of the processor 212 may control the electronic device 110 to implement operations 910 through 960 included in the sliding window managing method of FIG. 9. Here, the processor 212 and the constituent elements of the processor 212 may be configured to execute instructions according to a code of at least one program and a code of an OS included in the memory 211. Here, the constituent elements of the processor 212 may be representations of different functions executed at the processor 212. For example, the piece download controller 830 may be used as a functional representation of an operation of controlling the electronic device 110 so that the processor 212 downloads a piece in response to the instruction.

In operation 910, the processor 212 loads, to the memory 211, a program code stored in a file of a program for the sliding window managing method. For example, in response to an execution of the program installed on the electronic device 110, the processor 212 may control the electronic device 110 to load the program code from the file of the program to the memory 211. For example, the aforementioned program may be an application for the streaming client 351.

Here, the processor 212 and the virtual sliding piece array creator 810, the streaming sliding window creator 820, the piece download controller 830, the streaming processor 840, and the live sliding window creator 850 included in the processor 212 may execute operations 920 through 960 by executing a portion, for example, an instruction, corresponding to the program code loaded to the memory 211. To implement operations 920 through 960, the processor 212 and the constituent elements of the processor 212 may also control the electronic device 110. For example, the processor 212 may control the communication module 213 included in the electronic device 110 to communicate with another electronic device or another server, for example, the server 150.

In operation 920, the virtual sliding piece array creator 810 creates a virtual sliding piece array that includes information for specifying pieces from the latest point in time of live stream data to a previous point in time of a time machine available time preset to provide the time machine function. As described above with reference to FIGS. 5 through 7, the virtual sliding piece array may be configured in a data structure in which pieces and play locations classified based on time or a point in time are matched to each other and thereby stored as data for specifying pieces for each point in time. As another example, the virtual sliding piece array may be configured in a data structure of calculating the time corresponding to a specific play location and specifying a piece corresponding to the calculated time as a data structure of matching and storing pieces and time.

In operation 930, the streaming sliding window creator 820 creates a streaming sliding window for specifying a preset number of continuous pieces among pieces specified in the virtual sliding piece array. For example, a first index of the streaming sliding window may specify a piece corresponding to the virtual sliding piece array. Also, continuous indices of the streaming sliding window may specify corresponding continuous pieces of the virtual sliding piece array.

In operation 940, the piece download controller 830 controls the electronic device 110 to shift the streaming sliding window to a piece index of a play location requested for the live stream data, and to download the pieces specified in the virtual sliding piece array through the streaming sliding window. Here, the piece download controller 830 may download the specified pieces from at least one of a cache storage included in the electronic device 110, another electronic device, for example, the electronic device 120, connected using a P2P scheme, and the delivery server 330 that provides pieces of live stream data. As described above, an attempt to download the pieces based on priority order among the cache storage, the other electronic device, and the delivery server 330 may be made.

In operation 950, the streaming processor 840 streams stream data from a streaming client installed on the electronic device 110 to a player installed on the electronic device 110 using the downloaded pieces in order to provide a live streaming service.

In operation 960, the live sliding window creator 850 creates a live sliding window for specifying a preset number of most up-to-date continuous pieces among the pieces specified in the virtual sliding piece array. Here, operation 960 may be executed without restriction on a time after operation 920. For example, operation 960 may be performed together with operation 930 to create the live sliding window together with the streaming sliding window created in operation 930.

Here, although not illustrated, the sliding window managing method may further include downloading the pieces specified in the virtual sliding piece array through the live sliding window. This operation may be performed at the piece download controller 830.

As described above, the pieces specified and downloaded through the live sliding window may be stored in the cache storage included in the electronic device 110 or transmitted to another electronic device, for example, at least one peer among the plurality of peers 360, over the network 170 in order to share latest data of the live stream data, regardless of the pieces specified and downloaded through the live sliding window being used for streaming the stream data to the player.

Here, in response to overlapping between the streaming sliding window and the live sliding window, for example, in response to playing latest data of the live stream data, the piece download controller 830 may reuse the pieces specified through the live sliding window and stored in the cache storage of the electronic device 110. As described above, in the case of streaming the latest data while streaming previous data, the pieces downloaded through the live sliding window may be reused. Thus, it is possible to quickly provide the latest live video to the player.

The play location requested for the live stream data may be transmitted from the player 352 to the streaming client 351 through a time machine control session set between the streaming client and the player. Also, the stream data being streamed may be transmitted from the streaming client 351 to the player 352 through a streaming session set between the streaming client and the player. In this example, a data transmission between the streaming client 351 and the player 352 through the streaming session and a data transmission between the streaming client and the player through the time machine control session may proceed based on different separate protocols, for example, the time machine control protocol and the streaming protocol, respectively.

Description omitted in FIGS. 8 and 9 may refer to the description made above with reference to FIGS. 1 through 7.

According to some example embodiments, it is possible to download pieces of a play location specified through a time machine function using a streaming sliding window, and to further manage a live sliding window on which pieces for a latest live video are downloaded, separate from the streaming sliding window. Also, since pieces of a play location specified through the time machine function and pieces for latest data are downloaded simultaneously using a dual sliding window that includes the live sliding window and the streaming sliding window, it is possible to minimize (or, alternatively, reduce) the use effect of the time machine function over a sharing rate of pieces for the latest live video.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of managing a time machine function of video content, the method comprising:
    creating a virtual sliding piece array that includes information for specifying pieces from a latest point in time of live stream data to a previous point in time of a time machine available time preset to provide the time machine function;
    creating a streaming sliding window for specifying a preset number of continuous pieces among pieces specified in the virtual sliding piece array;
    shifting the streaming sliding window to a piece index of a play location requested for the live stream data, and downloading the pieces specified in the virtual sliding piece array through the streaming sliding window;
    streaming stream data from a streaming client installed on an electronic device to a player installed on the electronic device using the downloaded pieces in order to provide a live streaming service;
    creating a live sliding window for specifying a preset number of most up-to-date continuous pieces among the pieces specified in the virtual sliding piece array; and downloading the pieces specified in the virtual sliding piece array through the live sliding window simultaneously with the downloading of the pieces specified in the virtual sliding piece array through the streaming sliding window, wherein the play location requested for the live stream data is transmitted from the player to the streaming client through a time machine control session set between the streaming client and the player, and the stream data being streamed is transmitted from the streaming client to the player through a streaming session set between the streaming client and the player;

wherein a data transmission between the streaming client and the player through the streaming session proceed according to a first protocol and a data transmission between the streaming client and the player through the time machine control session proceed according to a second protocol, wherein the first and second protocols are independent from each other.

2. The method of claim 1, wherein the pieces specified and downloaded through the live sliding window are stored in a cache storage included in the electronic device or transmitted to another electronic device over a network in order to share latest data of the live stream data, regardless of the pieces specified and downloaded through the live sliding window being used for streaming the stream data to the player.

3. The method of claim 2, wherein the downloading of the pieces specified in the virtual sliding piece array through the streaming sliding window comprises reusing the pieces specified through the live sliding window and stored in the cache storage of the electronic device in response to overlapping between the streaming sliding window and the live sliding window.

4. The method of claim 1, wherein the downloading of the pieces specified in the virtual sliding piece array through the streaming sliding window comprises:

downloading the specified pieces from at least one of a cache storage included in the electronic device, another electronic device connected using a peer-to-peer (P2P) scheme, and a delivery server that provides pieces of the live stream data; and attempting to download the pieces based on priority order among the cache storage, the other electronic device, and the delivery server.

5. A non-transitory computer-readable recording medium storing a computer program to implement a method of managing a time machine function of video content, the program when executed by a computer performing the steps comprising:

creating a virtual sliding piece array that includes information for specifying pieces from a latest point in time of live stream data to a previous point in time of a time machine available time preset to provide the time machine function;

creating a streaming sliding window for specifying a preset number of continuous pieces among pieces specified in the virtual sliding piece array;

shifting the streaming sliding window to a piece index of a play location requested for the live stream data, and downloading the pieces specified in the virtual sliding piece array through the streaming sliding window;

streaming stream data from a streaming client installed on an electronic device to a player installed on the electronic device using the downloaded pieces in order to provide a live streaming service;

creating a live sliding window for specifying a preset number of most up-to-date continuous pieces among the pieces specified in the virtual sliding piece array; and downloading the pieces specified in the virtual sliding piece array through the live sliding window simultaneously with the downloading of the pieces specified in the virtual sliding piece array through the streaming sliding window;

wherein the play location requested for the live stream data is transmitted from the player to the streaming client through a time machine control session set between the streaming client and the player, and the stream data being streamed is transmitted from the streaming client to the player through a streaming session set between the streaming client and the player;

wherein a data transmission between the streaming client and the player through the streaming session proceed according to a first protocol and a data transmission between the streaming client and the player through the time machine control session proceed according to a second protocol, wherein the first and second protocols are independent from each other.

6. The non-transitory computer-readable recording medium of claim 5, wherein the pieces specified and downloaded through the live sliding window are stored in a cache storage included in the electronic device or transmitted to another electronic device over a network in order to share latest data of the live stream data, regardless of the pieces specified and downloaded through the live sliding window being used for streaming the stream data to the player.

7. The non-transitory computer-readable recording medium of claim 6, wherein the downloading of the pieces specified in the virtual sliding piece array through the streaming sliding window comprises reusing the pieces specified through the live sliding window and stored in the cache storage of the electronic device in response to overlapping between the streaming sliding window and the live sliding window.

8. The non-transitory computer-readable recording medium of claim 5, wherein the downloading of the pieces specified in the virtual sliding piece array through the streaming sliding window comprises:

downloading the specified pieces from at least one of a cache storage included in the electronic device, another electronic device connected using a peer-to-peer (P2P) scheme, and a delivery server that provides pieces of the live stream data; and attempting to download the pieces based on priority order among the cache storage, the other electronic device, and the delivery server.

9. A system for managing a time machine function of video content in an electronic device configured as a computer, the system comprising:

one or more processors configured to execute non-transitory computer-readable instructions, wherein the one or more processors comprise:

a virtual sliding piece array creator configured to create a virtual sliding piece array that includes information for specifying pieces from a latest point in time of live stream data to a previous point in time of a time machine available time preset to provide the time machine function;

a streaming sliding window creator configured to create a streaming sliding window for specifying a preset number of continuous pieces among pieces specified in the virtual sliding piece array;

a piece download controller configured to control the electronic device to shift the streaming sliding window to a piece index of a play location requested for the live stream data, and to download the pieces specified in the virtual sliding piece array through the streaming sliding window; and a streaming processor configured to stream stream data from a streaming client installed on an electronic device to a player installed on the electronic device using the downloaded pieces in order to provide a live streaming service; and a live sliding window creator configured to create a live sliding window for specifying a preset number of most-up-date continuous pieces among the pieces specified in the virtual sliding piece array; and wherein the piece download controller is further configured to download the pieces specified in the virtual sliding piece array through the live sliding window simultaneously with the downloading of the pieces specified in the virtual sliding piece array through the streaming sliding window, wherein the play location requested for the live stream data is transmitted from the player to the streaming client through a time machine control session set between the streaming client and the player, and the stream data being streamed is transmitted from the streaming client to the player through a streaming session set between the streaming client and the player;

wherein a data transmission between the streaming client and the player through the streaming session proceed according to a first protocol and a data transmission between the streaming client and the player through the time machine control session proceed according to a second protocol, wherein the first and second protocols are independent from each other.

10. The system of claim 9, wherein the pieces specified and downloaded through the live sliding window are stored in a cache storage included in the electronic device or transmitted to another electronic device over a network in order to share latest data of the live stream data, regardless of the pieces specified and downloaded through the live sliding window being used for streaming the stream data to the player.

11. The system of claim 9, wherein the piece download controller is further configured to download the specified pieces from at least one of a cache storage included in the electronic device, another electronic device connected using a peer-to-peer (P2P) scheme, and a delivery server that provides pieces of the live stream data, and attempt to download the pieces based on priority order among the cache storage, the other electronic device, and the delivery server.

* * * * *